L. J. BIRN.
MIXING HOE.
APPLICATION FILED MAR. 13, 1915.
1,167,971.
Patented Jan. 11, 1916.
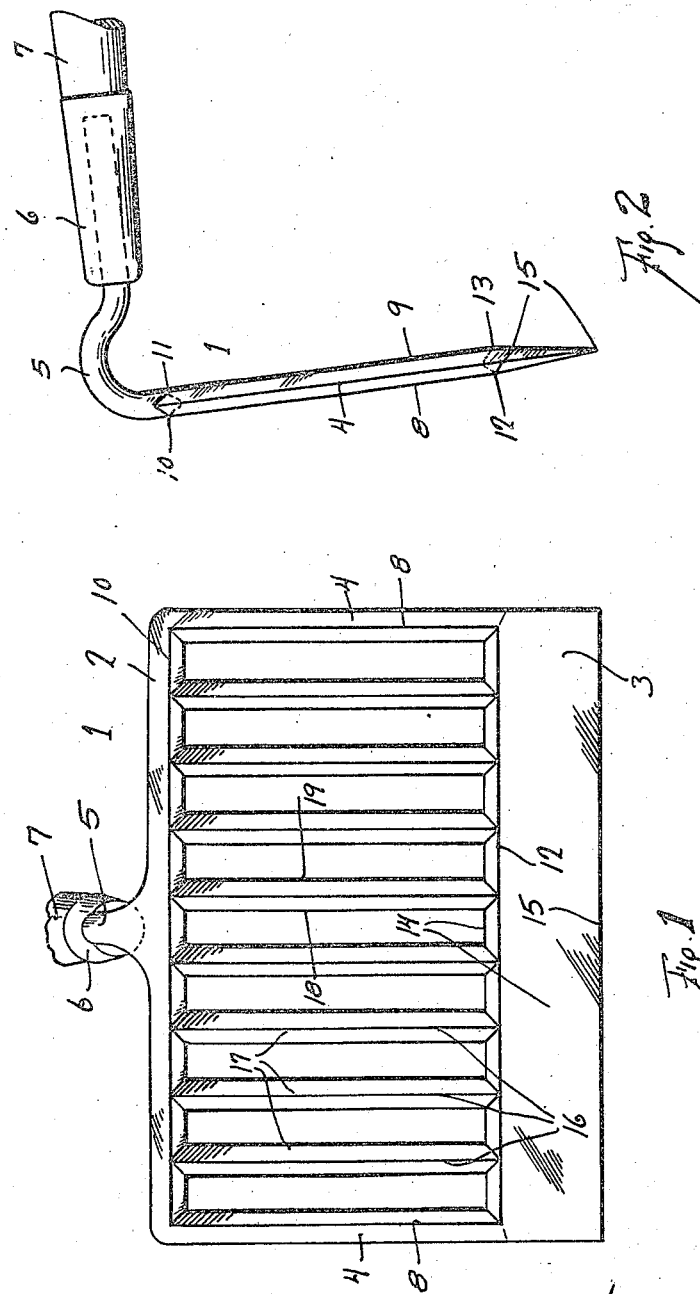
Inventor
Ludwig J. Birn
Witnesses
By
Attorney

UNITED STATES PATENT OFFICE.

LUDWIG J. BIRN, OF CHEWELAH, WASHINGTON.

MIXING-HOE.

1,167,971.  Specification of Letters Patent.  Patented Jan. 11, 1916.

Application filed March 13, 1915. Serial No. 14,147.

*To all whom it may concern:*

Be it known that I, LUDWIG J. BIRN, a citizen of the United States, residing at Chewelah, in the county of Stevens and State of Washington, have invented certain new and useful Improvements in Mixing-Hoes, of which the following is a specification.

This invention relates to improvements in hoes and has to do more particularly with that type of hoe which is especially adapted for mixing materials such as sand and cement, mortar and when used in the ground, it serves to thoroughly distribute the mass.

The device of my invention includes a hoe body composed of an open frame work having forwardly and rearwardly disposed edge portions which serve to divide the material as it passes therethrough so as to reduce resistance to forward and rearward movement of the hoe thereby greatly lessening the amount of thrust usually applied in forcing a hoe backwardly and forwardly through the material to be mixed.

A further feature of the invention consists in providing an open frame work the members of which diverge in opposite directions, from the forwardly and rearwardly disposed edges, in the direction of the plane of the hoe body, in such a manner that the material will be relatively widely separated as the open frame work passes therethrough.

A further feature of novelty consists in providing the open framework with a lower bar having a downwardly projecting sharp edge whereby material which is being mixed in a bed, will be prevented from escaping action of the hoe by descending to the bottom of the bed.

Other objects and features of novelty will be more fully described in connection with the accompanying drawing and will be more particularly pointed out in and by the appended claims.

In the drawing:—Figure 1 is a view in elevation of a hoe body embodying one form of my invention. Fig. 2 is an edge view thereof showing the handle therefor.

Like characters of reference designate similar parts throughout the different figures of the drawing.

As illustrated, my improved hoe comprises a hoe body 1, composed of an open framework. The framework of the hoe body is shown substantially rectangular and is composed of upper and lower horizontal frame members 2 and 3, respectively, and end vertical members 4. To the upper member 2, is attached or integrally formed therewith a handle attaching shank 5 which projects laterally from the plane of the hoe body, in the usual way, for attachment of the ferrule 6 and handle 7. The frame of said hoe body is herein shown formed of bars which are diamond shaped in cross section, each bar having forwardly and rearwardly disposed longitudinal edges, as indicated in connection with bar 4, at 8 and 9. These oppositely disposed sharp edges operate to efficiently divide the material through which the hoe frame is passing so as greatly to reduce resistance usual in the operation or movement to and fro of the hoe through rather thick material. The edges serve to divide the material in a manner similar to the action of the prow of a boat passing through water. This is not only true of the end bars 4, but also of the upper and lower bars 2 and 3. The upper bar 2 has oppositely disposed sharp edges 10 and 11 and the lower bar 3 has oppositely disposed sharp portions 12 and 13. Now a further feature of this construction consists in the fact that the bars diverge from their sharp edges to the point of greatest cross section, as indicated in connection with bar 3 at 14 and 15. Thus it will be seen that while the sharp edges 12 and 13 tend to separate the material through which the bar is passing, it will also be evident that the vertical cross section is sufficient to very effectively displace the material engaged by bar 3. Bar 3 performs a further function when the hoe is used for mixing material in a mortar bed or the like, in that it effectively engages the material that descends to the bottom of the bed and serves to agitate such material so as to raise it above the bottom of the bed and into an upper stratum of the mass. The sharp lower or downwardly projecting edge 15, serves effectively to catch all of the material along the bottom of the bed and prevent the formation of a thin inactive layer thereon.

The open portion of the frame formed by bars 2, 3 and 4, is intersected by a plurality of mixing bars 16, and these bars are likewise preferably of diamond cross section with forwardly and rearwardly, or in other words, oppositely disposed sharp longitudinal edges, the forward edges being indicated at 17 in Fig. 1. These mixing bars 16 also diverge laterally from their forwardly and rearwardly disposed sharp edges, as indicated at 18 and 19, in such a manner as to materially displace the substance being mixed after the substance has been divided by the sharp edges. It will be observed, that the cross section of lower bar 3, is slightly greater than that of the other bars, by reason of the fact that it is necessary to have a sharper and more extendedly graduated tapering edge 15 when the hoe is used for agricultural purposes.

Now it will not only be seen that the open framework prevents excessive resistance common to an imperforate or partially perforate hoe body but because of the peculiar formation of the frame bars, their efficiency in mixing and displacing the material through which the hoe body is passed is greatly increased over mere partially perforated or wholly imperforate hoe bodies.

While I have herein shown and described one specific form of my invention, I do not wish to be limited thereto except for such limitations as the claims may import.

I claim:

1. A mixing hoe comprising an open frame provided with a handle, and mixing bars extending across the open portion of said frame and of diamond cross section and having their longitudinally extending sharp edge portions disposed forwardly and rearwardly with respect to the plane of the hoe, substantially as described.

2. A mixing hoe comprising a hoe body composed of an open frame including a lower bar, said lower bar being of substantially diamond shaped cross section with one sharp edge elongated and disposed downwardly, substantially as described.

3. A mixing hoe comprising a hoe body composed of an open framework with the framework portions having forwardly and rearwardly disposed sharp edges, said portions diverging from said sharp edges in plane of the hoe body, substantially as described.

In testimony whereof I affix my signature in presence of a witness.

LUDWIG J. BIRN.

Witness:
H. E. SMITH.